Aug. 8, 1950  C. REILLEY ET AL  2,518,065
CLEARANCE INDICATOR FOR AUTOMOBILES
Filed July 11, 1947  2 Sheets-Sheet 1

Inventors
Carl Reilley,
Sheldon B. Smith,
By McMorrow, Berman & Davidson
Attorneys

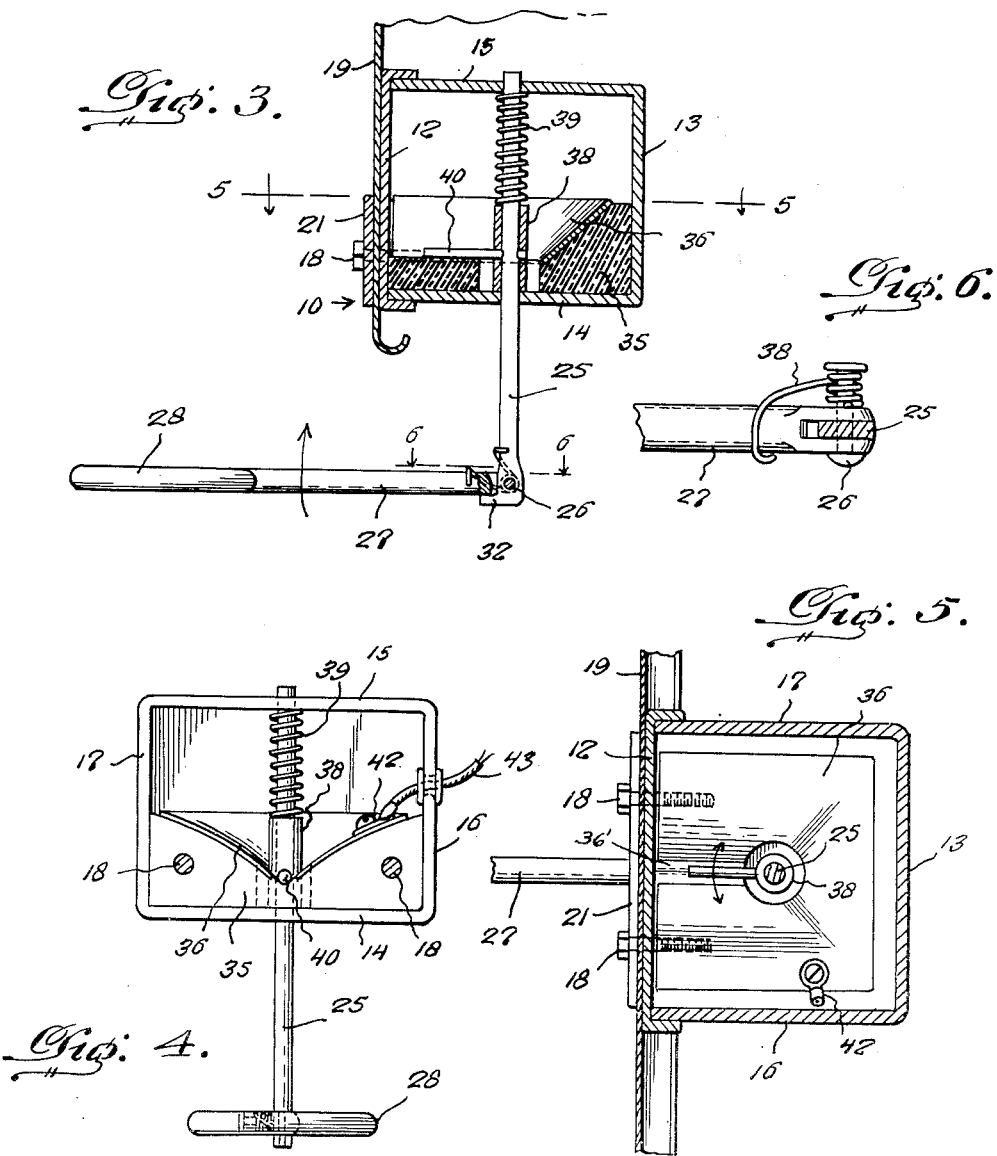

Patented Aug. 8, 1950

2,518,065

UNITED STATES PATENT OFFICE 2,518,065

CLEARANCE INDICATOR FOR AUTOMOBILES

Carl Reilley and Sheldon B. Smith, Newport Beach, Calif.

Application July 11, 1947, Serial No. 760,186

3 Claims. (Cl. 200—52)

This invention relates to an improved curb clearance indicator for automobiles, and has for its primary object the provision of a more practical and efficient arrangement of feeler arm adjacent the fender for yieldably engaging the curb and thereby simultaneously operate an electrical signal to warn the driver.

Another important object of the invention is to provide a device of this kind which is less destructible by contact with the curb or other road obstructions.

The accompanying drawings illustrate a preferred embodiment of the invention, but it is understood that modifications may be made without departing from the spirit of the invention as hereinafter claimed.

Figure 3 is an enlarged vertical section, taken on line 3—3 of Figure 1.

Figure 4 is a side elevation of the structure of Figure 3, a portion being shown in section.

Figure 5 is a horizontal section, taken on line 5—5 of Figure 3.

Figure 6 is an enlarged horizontal section, taken on line 6—6 of Figure 3.

Figure 1:
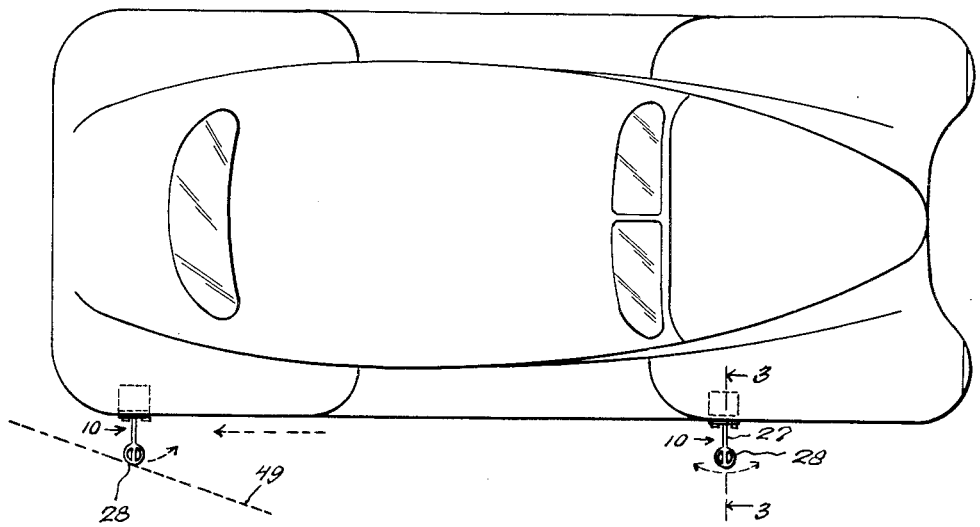
Figure 1 is a plan view of a vehicle equipped with the new and improved indicator.
Figure 2:
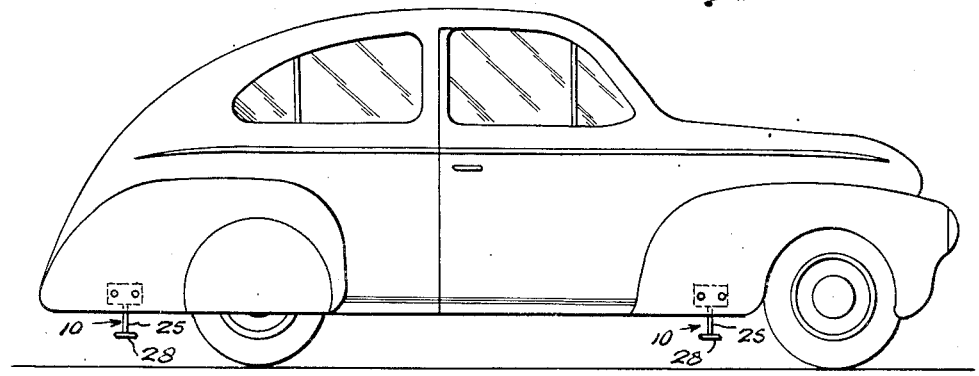
Figure 2 is a side elevation of the same vehicle.
Figure 7:
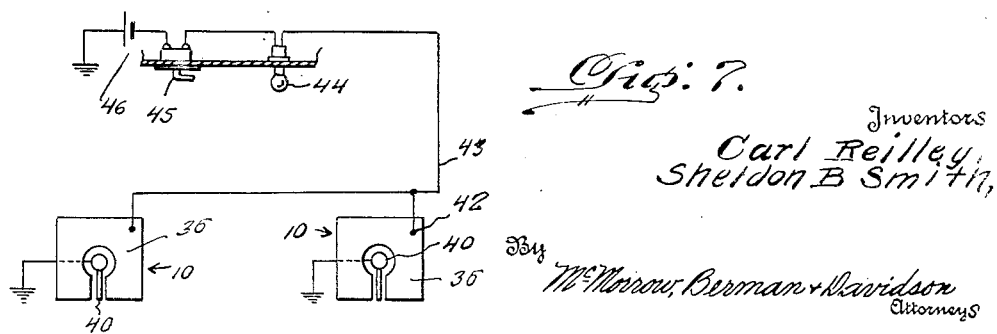
Figure 7 is a wiring diagram of the device.

A motor vehicle is shown equipped with two similar indicating devices 10, one for the right front fender and one for the right rear fender. It is obvious that such a device may be attached to any other suitable part on the automobile.

The device 10 comprises a rectangular metal switch casing having sidewalls 12 and 13, a bottom 14, a top 15, and end walls 16 and 17. One sidewall 12 may form a cover. A pair of bolts 18, 18, traversing the cover 12, is adapted to fasten the casing to the inboard side of a fender 19, and, if desired, a bracket 21 may reinforce the attachment.

A vertical shaft 25 is supported rotatably and slidably in the top and bottom of the casing for rotation and sliding about its axis. Pivoted to the lower extremity of the shaft 25, by a horizontal pivot pin 26, is a horizontal arm 27 terminating in an enlarged feeler loop 28. This loop 28 is shown as horizontal, but it obviously may have other shapes or positions. A coil spring 30 mounted on an extension of the horizontal pin 26 has one end pressing against the shaft 25 and the other end pressing against the arm 27 so as to yieldably depress the arm 27. An angular offset 32 on the lower end of shaft 25 limits downward movement of the arm 27 to substantially 90 degrees relative to shaft 25. It will be apparent that the loop 28 is free to move upwardly against the resistance of the spring 30 but cannot move downwardly beyond a horizontal position.

On the bottom 14 of the casing is a trough-shaped insulating base 35, the trough extending centrally from the side wall 12 toward the side wall 13 remote from the fender 19. The base 35 is suitably recessed to pass the shaft freely. A brass contact plate 36 having generally the shape and contour of the upper surface of the base 35, is fixed thereon.

Fixed on the lower part of the portion of the shaft 25 within the casing is a sleeve 38. A coil spring 39, mounted on the shaft 25 between the casing top 15 and the sleeve 38, has one end secured to the top 15 and the other end to the sleeve 38, so that the shaft 25 and the sleeve are normally rotated to and held down in a predetermined normal or neutral position. A radial contactor arm 40 is secured to the sleeve 38 to normally occupy a position between and out of contact with the edges of a slot 36' formed longitudinally in the bottom of the contact plate 36. As a result, there is no electrical engagement of the contactor arm 40 and the contact plate 36 in the neutral or normal position of the feeler arm 27. However, if the feeler arm 27 is displaced laterally the sleeve 38 is thereby rotated and the contactor arm 40 will come into camming contact with and climb up on one of the slanting sides of the contact plate 36, thereby making positive electrical contact therewith and closing the signal or indicator circuit.

A terminal 42 on the plate 36 is connected by a cable 43 to a dashlight 44, and, if desired, to the ignition switch 45 of the automobile. The switch 45 is, of course, connected to the storage battery 46 and thence to ground. The shaft 25 is connected to ground through the fender 19 by way of the top 15 and sidewall 12 of the switch casing. As a result, engagement of the contactor arm 40 with any portion of the plate 36 with the ignition switch 45 in "on" position, will actuate the signal 44.

In installing of the device 10, the feeler arm 27 is positioned to project the desired distance beyond the fender 19, say three inches. When the driver is parking and comes too close to the curb 49 the feeler arm loop 28 will engage the curb and be thereby laterally displaced so as to rotate the shaft 25. The sleeve 38 will thereby be turned against the tension of the spring 39 so as to engage the contactor arm 40 with one side or the other of the contact plate 36 and thereby close the circuit to the signal 44, thereby apprising the driver of the fact that he does not have sufficient clearance with the curb. The signal 44 can be visual or audible or both.

The articulation of the feeler arm 27 with respect to the shaft 25 and the vertically yielding of the spring 39 on the shaft 25 permit the arm 27 and shaft 25 to be harmlessly displaced by road obstructions, including curbs, coming in contact therewith.

As hereinbefore mentioned, all four fenders and the front and rear bumper of the car may be equipped with such devices 10. Each device 10 may have a separate signal 44, or all may be connected to a single signal 44, since ordinarily the driver will have no difficulty in ascertaining which part of the vehicle is being bumped.

What is claimed is:

1. In a switch for an automobile curb clearance indicator, a support adapted to be mounted on the curb side of the automobile, a vertical shaft journalled in and depending from said support, a radial contactor arm on said shaft, an insulated fixed contact plate on said support surrounding said shaft having inwardly declining sides terminating in a bottom formed with a slot whose edges are out of contact with said contactor arm while said contactor arm is in its neutral position, a radial feeler arm on the lower end of said shaft projecting in the direction of the curb and arranged to be laterally deflected by engagement with the curb and rotatably displace said shaft whereby said radial contactor arm is moved out of its neutral position and into contact with one of the declining sides of said fixed contact plate, and spring means connected to and between said shaft and said support for returning said shaft and said contactor arm to their neutral positions after displacement.

2. In a switch for an automobile curb clearance indicator, a support adapted to be mounted on the curb side of the automobile, a vertical shaft journalled in and depending from said support, a radial contactor arm on said shaft, an insulated fixed contact plate on said support surrounding said shaft having inwardly declining sides terminating in a bottom formed with a slot whose edges are out of contact with said contactor arm while said contactor arm is in its neutral position, a radial feeler arm on the lower end of said shaft projecting in the direction of the curb and arranged to be laterally deflected by engagement with the curb and rotatably displace said shaft whereby said radial contactor arm is moved out of its neutral position and into contact with one of the declining sides of said fixed contact plate, and spring means connected to and between said shaft and said support for returning said shaft and said contactor arm to their neutral positions after displacement, said shaft being journalled in said support for limited vertical displacement, said spring means operating between said support and said shaft so as to yieldably resist upward displacement of said shaft.

3. In a switch for an automobile curb clearance indicator, a support adapted to be mounted on the curb side of the automobile, a vertical shaft journalled in and depending from said support, a radial contactor arm on said shaft, an insulated fixed contact plate on said support surrounding said shaft having inwardly declining sides terminating in a bottom formed with a slot whose edges are out of contact with said contactor arm while said contactor arm is in its neutral position, a radial feeler arm on the lower end of said shaft projecting in the direction of the curb and arranged to be laterally deflected by engagement with the curb and rotatably displace said shaft whereby said radial contactor arm is moved out of its neutral position and into contact with one of the declining sides of said fixed contact plate, and spring means connected to and between said shaft and said support for returning said shaft and said contactor arm to their neutral positions after displacement, said shaft being journalled in said support for limited vertical displacement, said spring means operating between said support and said shaft so as to yieldably resist upward displacement of said shaft, said radial feeler arm being pivoted on said shaft to move from a normal horizontal position to an inclined position, and spring means for resisting upward movement of said feeler arm from its normal horizontal position.

CARL REILLEY.
SHELDON B. SMITH.

REFERENCES CITED

The following references are of record in the file of this patent:

UNITED STATES PATENTS

| Number | Name | Date |
|---|---|---|
| 1,709,400 | Hess | Apr. 16, 1929 |
| 2,060,771 | Kempf | Nov. 10, 1936 |
| 2,243,497 | Bougie | May 27, 1941 |
| 2,259,614 | Chang | Oct. 21, 1941 |

FOREIGN PATENTS

| Number | Country | Date |
|---|---|---|
| 781,942 | France | Mar. 4, 1935 |